United States Patent
McCornack

(10) Patent No.: US 7,688,534 B1
(45) Date of Patent: Mar. 30, 2010

(54) EXTRACTING REPEATABLE PHASE ERROR FROM A SPINDLE MOTOR BACK EMF SIGNAL TO GENERATE A SERVO WRITE CLOCK

(75) Inventor: Mark R. McCornack, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/333,016

(22) Filed: Dec. 11, 2008

(51) Int. Cl.
G11B 27/036 (2006.01)
G11B 21/02 (2006.01)
G11B 5/09 (2006.01)

(52) U.S. Cl. .............................. 360/31; 360/75; 360/51
(58) Field of Classification Search ....................... None
See application file for complete search history.

(56) References Cited

U.S. PATENT DOCUMENTS

| | | | |
|---|---|---|---|
| 5,535,067 A | 7/1996 | Rooke | |
| 5,668,679 A | 9/1997 | Swearingen et al. | |
| 6,172,830 B1 | 1/2001 | Leonard | |
| 6,674,602 B2 | 1/2004 | Miles | |
| 6,825,622 B1 | 11/2004 | Ryan et al. | |
| 7,042,668 B1 | 5/2006 | Emo | |
| 7,248,549 B2 | 7/2007 | Rauschmayer | |
| 7,256,956 B2 | 8/2007 | Ehrlich | |
| 7,330,326 B2 | 2/2008 | Hanks | |
| 7,391,584 B1 * | 6/2008 | Sheh et al. .................... 360/51 |

* cited by examiner

Primary Examiner—K. Wong

(57) ABSTRACT

A method of writing servo data onto a disk is disclosed. A spindle motor spins the disk, and a back electromotive force (BEMF) signal is measured from the spindle motor. A repeatable phase error (RPE) is extracted from the BEMF signal to generate an adjusted BEMF signal. A servo write clock is synchronized in response to the adjusted BEMF signal, and the servo data is written to the disk using the servo write clock. In one embodiment, the servo data comprises spiral seed patterns that are processed to write concentric servo sectors to the disk.

20 Claims, 10 Drawing Sheets

EXTRACTING REPEATABLE PHASE ERROR FROM A SPINDLE MOTOR BACK EMF SIGNAL TO GENERATE A SERVO WRITE CLOCK

BACKGROUND

Description of the Related Art

Disk drives comprise a disk and a head connected to a distal end of an actuator arm which is rotated about a pivot by a voice coil motor (VCM) to position the head radially over the disk. FIG. 1 shows a prior art disk format comprising a plurality of radially spaced, concentric tracks 2 defined by a plurality of concentric servo sectors $4_0$-$4_N$. The servo sectors comprises head positioning information which is read by the head and processed by a servo control system to control the velocity of the actuator arm as it seeks from track to track. In the example format shown in FIG. 1, each servo sector (e.g., servo sector $4_4$) comprises a preamble 6 for synchronizing gain control and timing recovery, a sync mark 8 for synchronizing to a data field 10 comprising coarse head positioning information (such as a Gray coded track address), and servo bursts 12 which provide fine head positioning information.

The servo sectors $4_0$-$4_N$ may be written to the disk using any suitable technique. For example, an external servo writer or a media writer may write the servo sectors directly to the disk. Alternatively, seed patterns may be written to the disk, such as spiral seed patterns, which are then processed to write the servo sectors to the disk, for example, using control circuitry internal to each disk drive. When writing the servo sectors or seed patterns, a servo write clock is typically synchronized to the rotation of the disk so that the servo data is written at the desired circumferential locations.

DETAILED DESCRIPTION OF EMBODIMENTS OF THE INVENTION

Figure 2B:
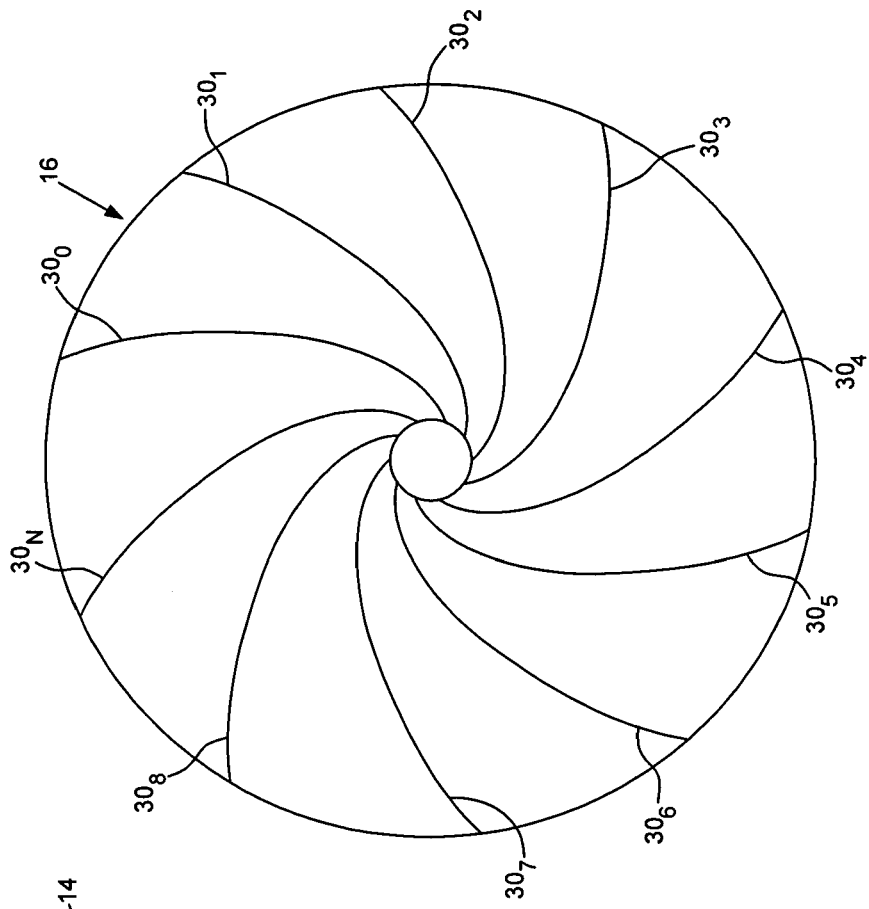
FIG. 2B shows an embodiment wherein the servo data comprises spiral seed patterns which are processed to write concentric servo sectors.
Figure 2A:
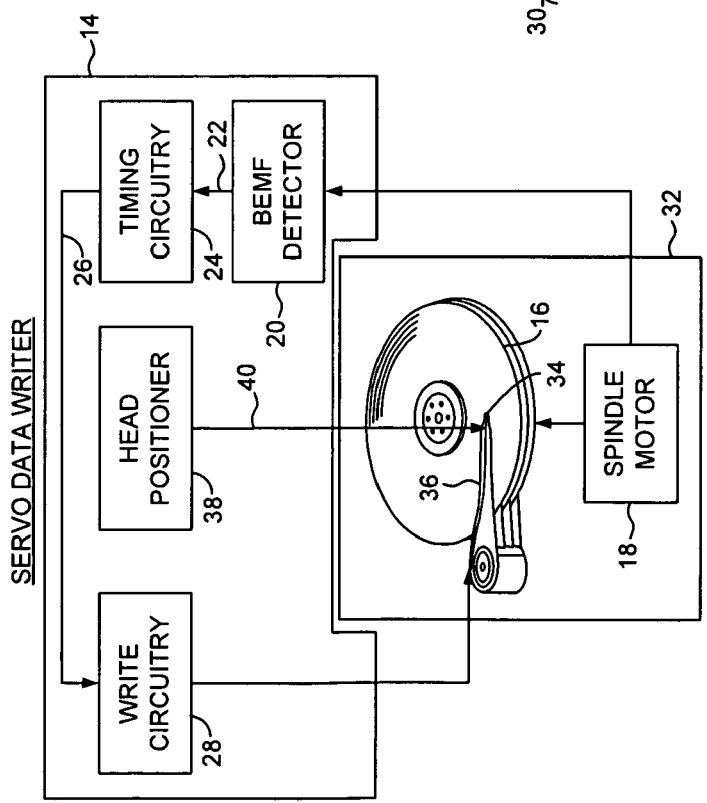
FIG. 2A shows a servo data writer according to an embodiment of the present invention which synchronizes a servo write clock in response to a BEMF signal generated by the spindle motor.

FIG. 2A shows a servo data writer 14 for writing servo data to a disk 16 of a disk drive according to an embodiment of the present invention. A spindle motor 18 spins the disk 16, and a back electromotive force (BEMF) detector 20 detects a BEMF signal 22 from the spindle motor 18. Timing circuitry 24 extracts a repeatable phase error (RPE) from the BEMF signal 22 to generate an adjusted BEMF signal, and synchronizes a servo write clock 26 in response to the adjusted BEMF signal. Write circuitry 28 writes the servo data to the disk 16 using the servo write clock 26.

Figure 1:
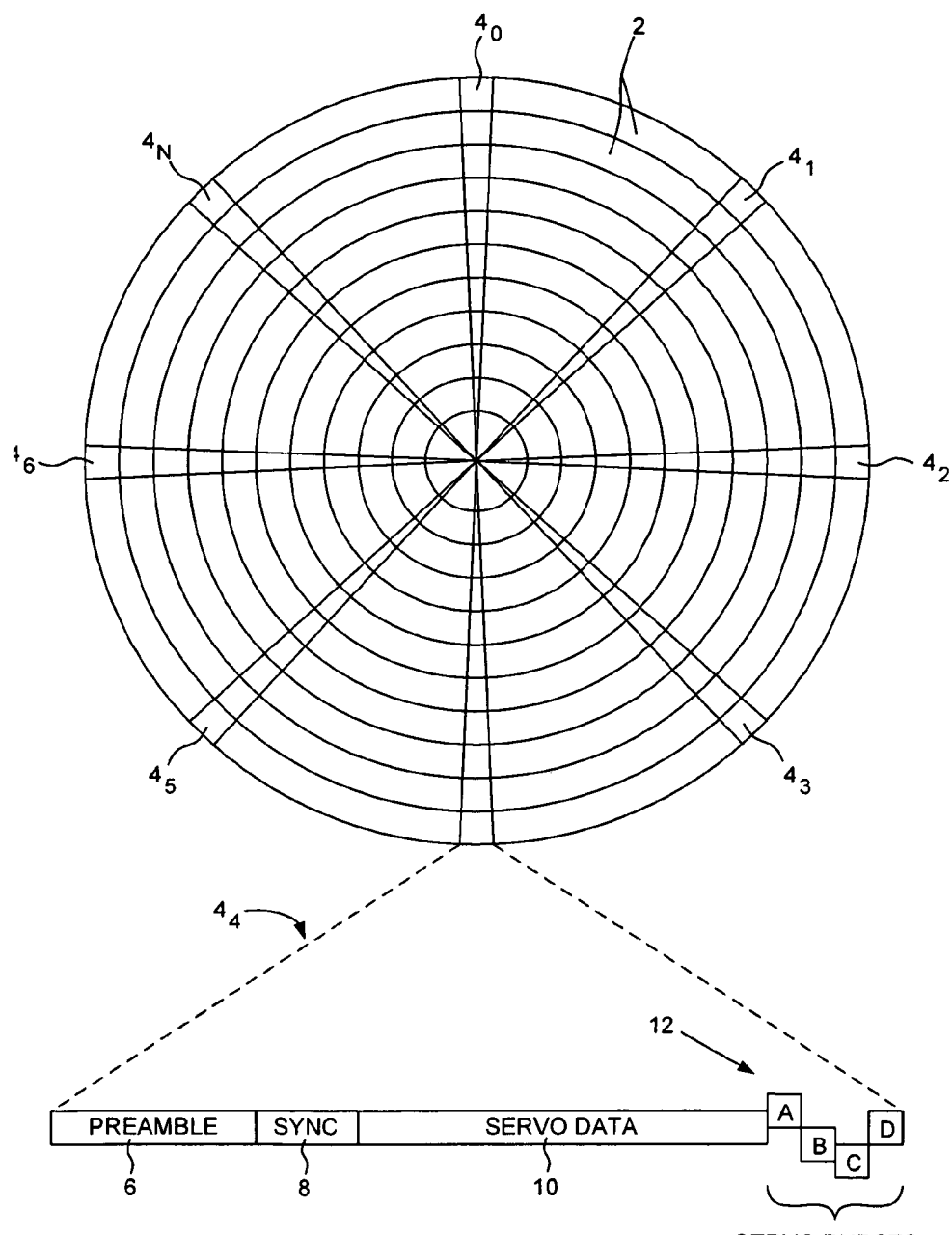
FIG. 1 shows a prior art disk format including a plurality of tracks defined by concentric servo sectors.
Figure 2C:
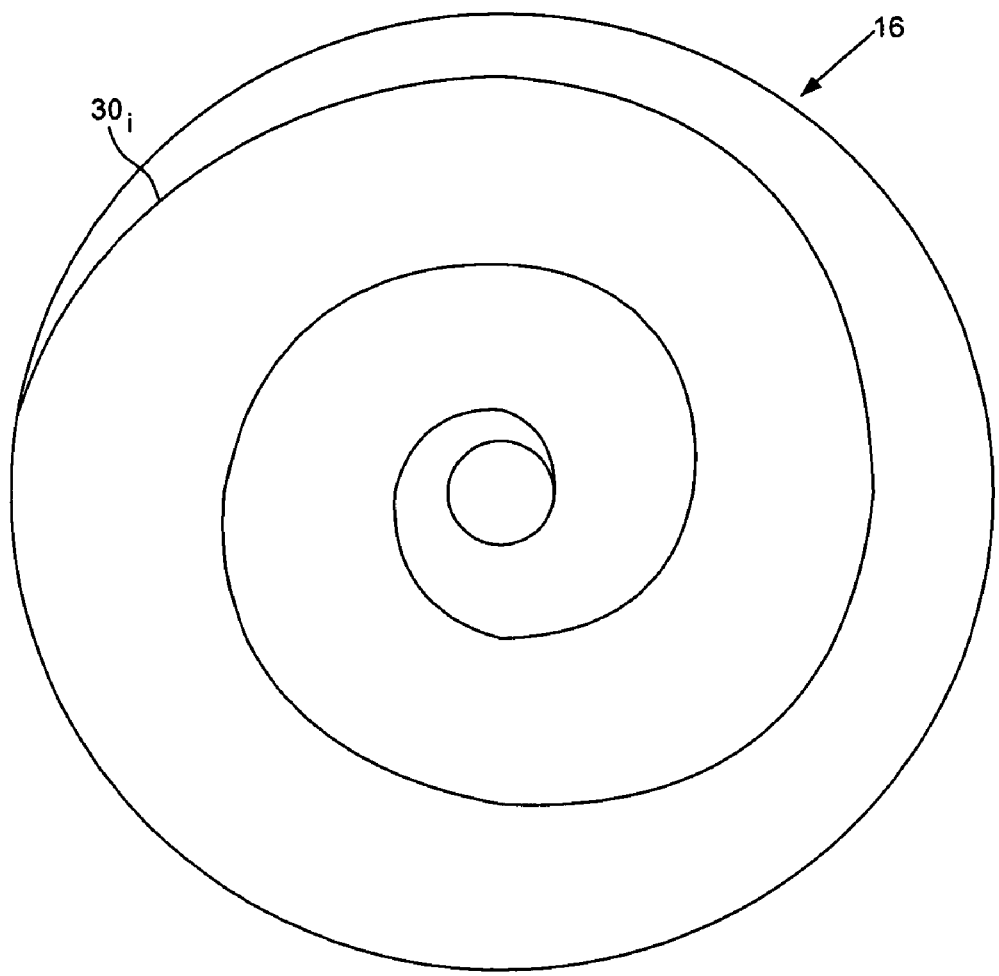
FIG. 2C shows an embodiment wherein each spiral seed pattern is written over multiple disk revolutions.

Any suitable servo data may be written to the disk in the embodiments of the present invention. In the embodiment of FIG. 2A, the servo data writer 14 writes a plurality of spiral seed patterns $30_0$-$30_N$ to the disk 16 (FIG. 2B). In one embodiment, the spiral seed patterns $30_0$-$30_N$ are processed to write concentric servo sectors to the disk (e.g., as shown in FIG. 1). Each spiral seed pattern $30_i$ may be written over a partial disk revolution as shown in FIG. 2B, or over multiple disk revolutions as shown in FIG. 2C.

In the embodiment of FIG. 2A, a head disk assembly (HDA) 32 is connected to the servo data writer 14, wherein the HDA 32 houses the disk 16, the spindle motor 18 for rotating the disk 16, and a head 34 connected to a distal end of an actuator arm 36 which is rotated about a pivot in order to position the head radially over the disk 16. The servo data writer comprises a head positioner 38 which actuates the actuator arm 36 using a head positioning pin 40 inserted into the HDA 32. When writing a spiral seed pattern $30_i$ to the disk 16, the servo write clock 26 enables the write circuitry 28 to begin writing the spiral seed pattern $30_i$ at the appropriate circumferential location in a manner that maintains a substantially constant spacing between the spiral seed patterns. In an alternative embodiment, the servo data writer 14 may comprise a media writer which writes the servo data (e.g., spiral seed patterns) to a number of disks, and thereafter one or more disks are installed into the HDA 32.

In one embodiment, the BEMF voltage generated across the windings of the spindle motor 18 is used to generate the servo write clock 26 synchronized to the rotation of the disk. In one embodiment, the BEMF voltage is compared to a threshold (e.g., zero) in order to generate a periodic pulse train having a frequency related to the disk rotation. However, mechanical variances of the spindle motor (e.g., variances in the stator teeth) may induce a repeatable disturbance (phase error) in the periodic pulse train that should be compensated when generating the servo write clock 26.

Figure 3:
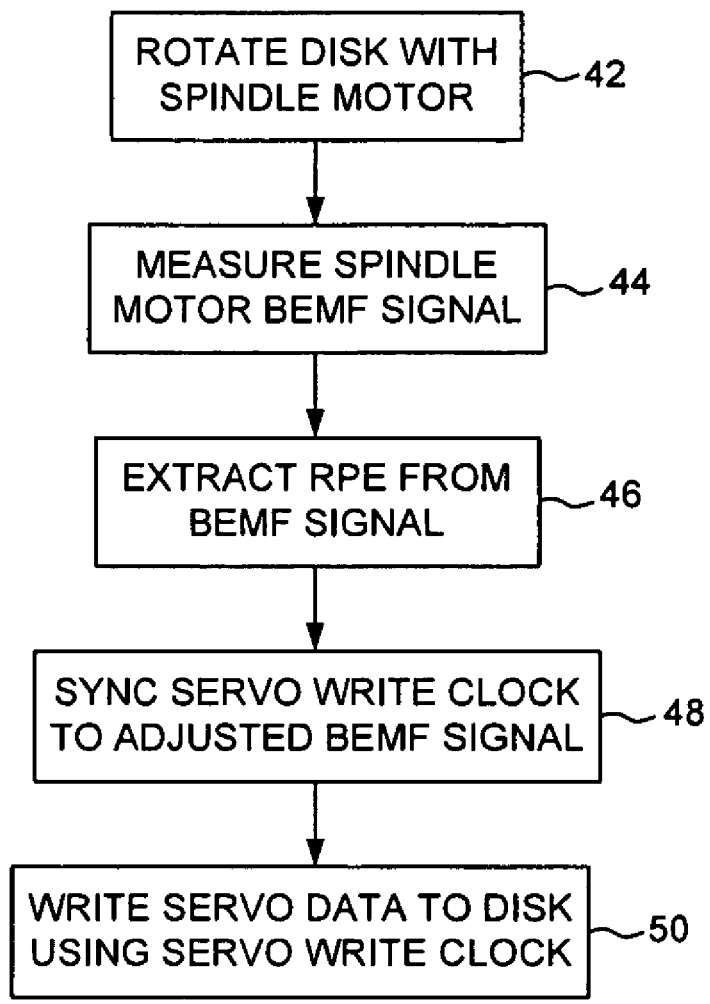
FIG. 3 is a flow diagram according to an embodiment of the present invention wherein a repeatable phase error (RPE) is extracted from the BEMF signal to generate an adjusted BEMF signal, and the servo write clock is synchronized to the adjusted BEMF signal.

FIG. 3 is a flow diagram according to an embodiment of the present invention for generating the servo write clock 26. The disk is rotated with the spindle motor (step 42) and a BEMF signal is measured in response to the spindle motor (step 44). A repeatable phase error (RPE) is extracted from the BEMF signal in order to generate an adjusted BEMF signal (step 46). The servo write clock is synchronized to the adjusted BEMF signal with the contribution of the RPE substantially removed from the BEMF signal (step 48), wherein the servo write clock is used to write servo data to the disk (step 50).

Figure 4A:
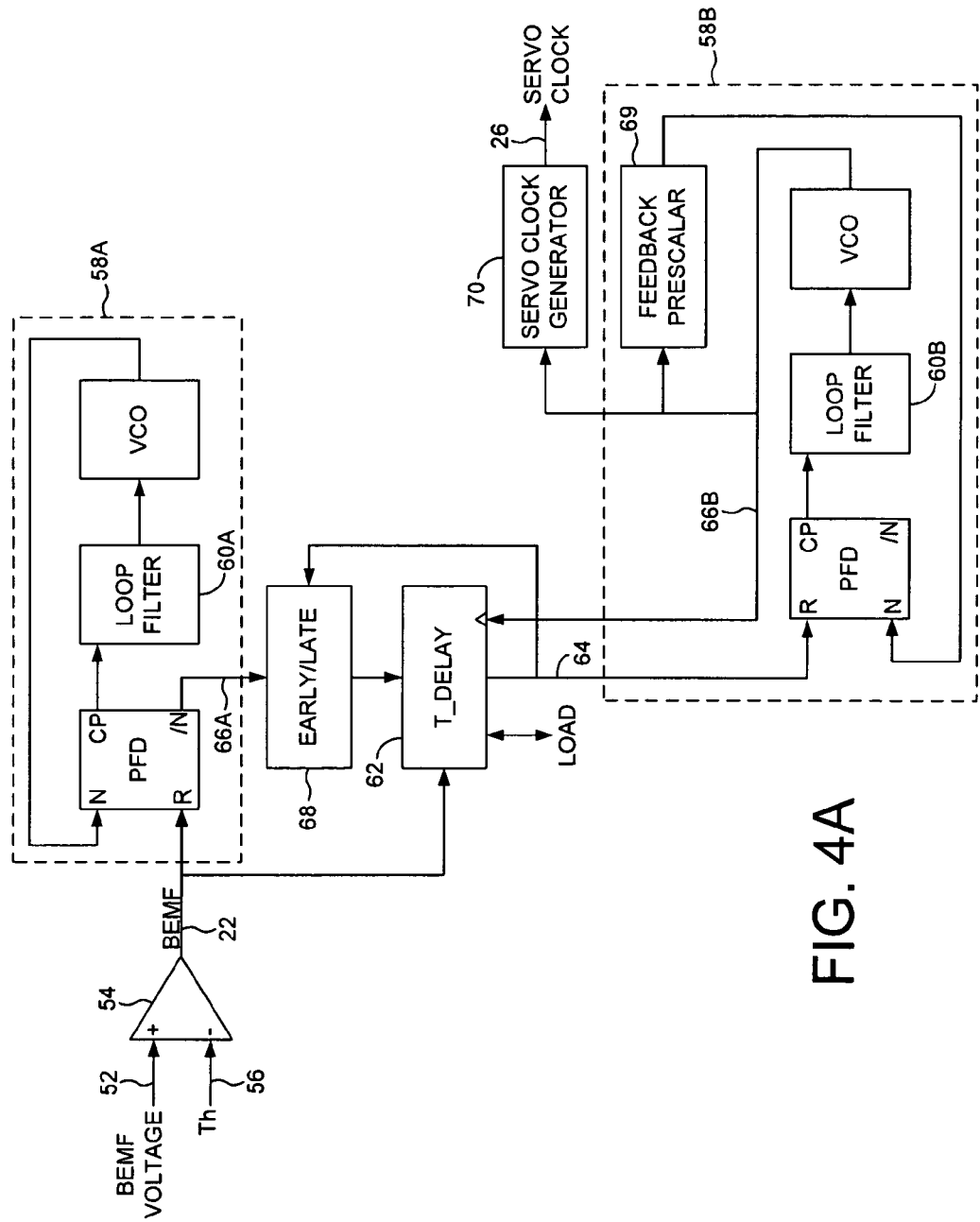
FIG. 4A shows timing circuitry according to an embodiment of the present invention for extracting the RPE from the BEMF signal using a first phase-locked loop (PLL), and a second PLL for synchronizing the servo write clock to the adjusted BEMF signal.

FIG. 4A shows timing circuitry according to an embodiment of the present invention wherein the BEMF voltage 52 generated by the spindle motor 18 is compared 54 to a threshold 56 (e.g., zero) to generate a periodic pulse train BEMF signal 22. A first phase-locked loop (PLL) 58A is synchronized to the BEMF signal 22. A bandwidth of the PLL loop filter 60A is selected low enough so that the first PLL 58A is substantially unaffected by the RPE in the BEMF signal 22. A delay register 62 stores a delay value for each cycle of the BEMF signal 22, wherein the delay value delays the corresponding cycle of the BEMF signal 22 to generate an adjusted BEMF signal 64 substantially free of the RPE. The adjusted BEMF signal 64 is compared to the output 66A of the first PLL 58A, and the corresponding delay value stored in delay register 62 is adjusted 68 depending on whether the cycle of the adjusted BEMF signal 64 occurs before or after the corresponding cycle of the output 66A of the first PLL 58A.

A second PLL 58B is synchronized to the adjusted BEMF signal 64 using a loop filter 60B having a suitable bandwidth to track the variations in the adjusted BEMF signal 64 due to variations in the disk rotation speed. Since the RPE is substantially attenuated from the adjusted BEMF signal 64, the second PLL 58A is substantially unaffected by the RPE. In one embodiment, a bandwidth of the second loop filter 60B is substantially higher than the bandwidth of the first loop filter 60A.

In the embodiment of FIG. 4A, a feedback prescalar 69 scales the output 66B of the second PLL 58B so that the frequency of the output 66B is a desired multiple of the adjusted BEMF signal 64. In this manner, the PLL output 66B can be used to clock the delay register 62 with a suitable resolution. The timing circuitry of FIG. 4A further comprises a suitable servo clock generator 70 for generating the servo write clock 26 at the desired frequency (which may be the same or a multiple of the frequency of the adjusted BEMF signal 64).

Figure 4B:
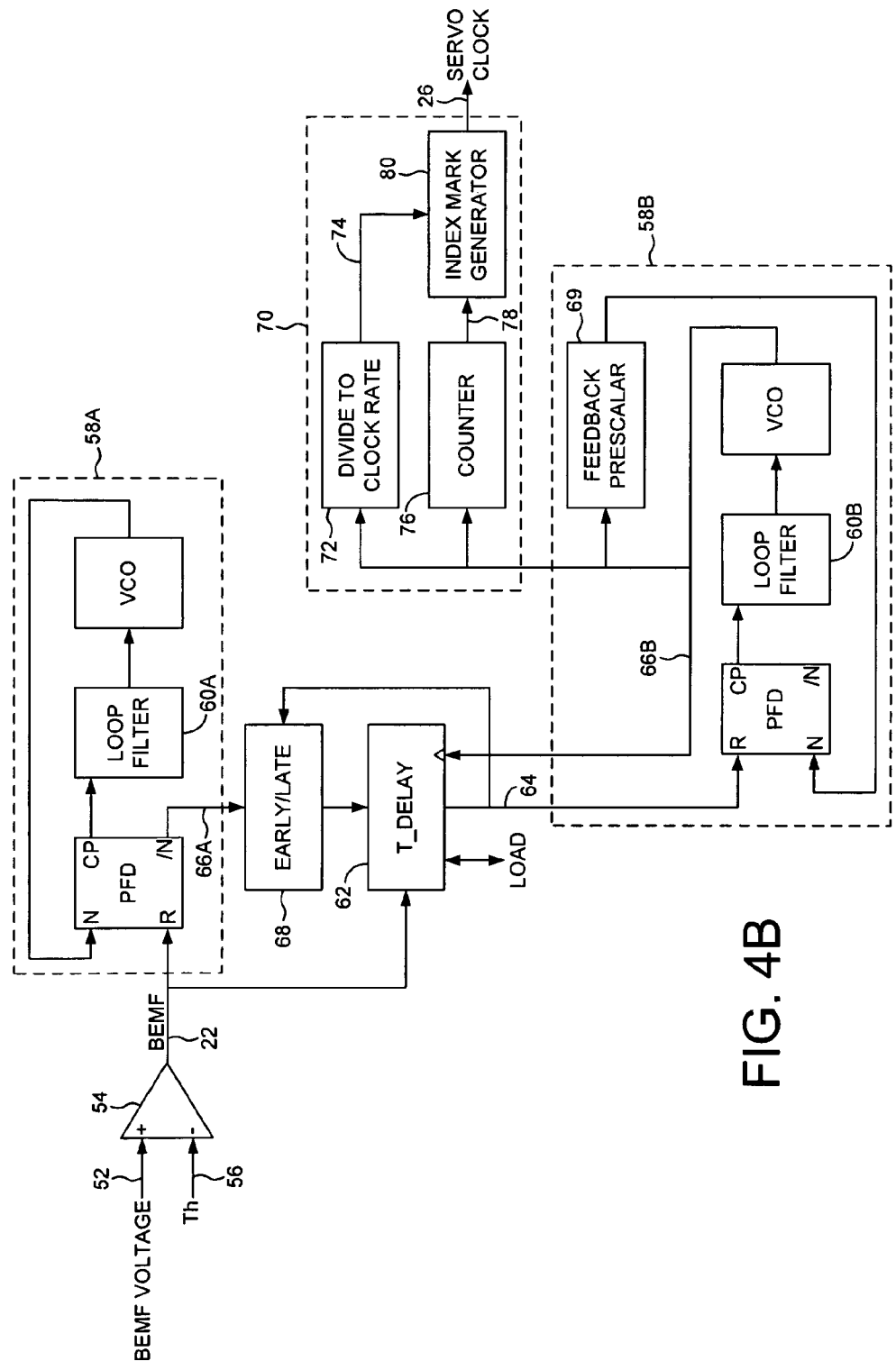
FIG. 4B shows timing circuitry according to an embodiment of the present invention including circuitry for generating an index mark in the servo write clock.

FIG. 4B shows an embodiment wherein the servo clock generator 70 comprises a divider 72 for scaling the output 66B of the second PLL 58B to a clock signal 74 having a suitable frequency. A counter 76 periodically outputs a pulse 78 after counting a suitable number of cycles in signal 66B. An index mark generator 80 responds to the pulse 78 by dropping one or more cycles in signal 74 to thereby generate an index mark in the resulting servo write clock 26.

Figure 5:
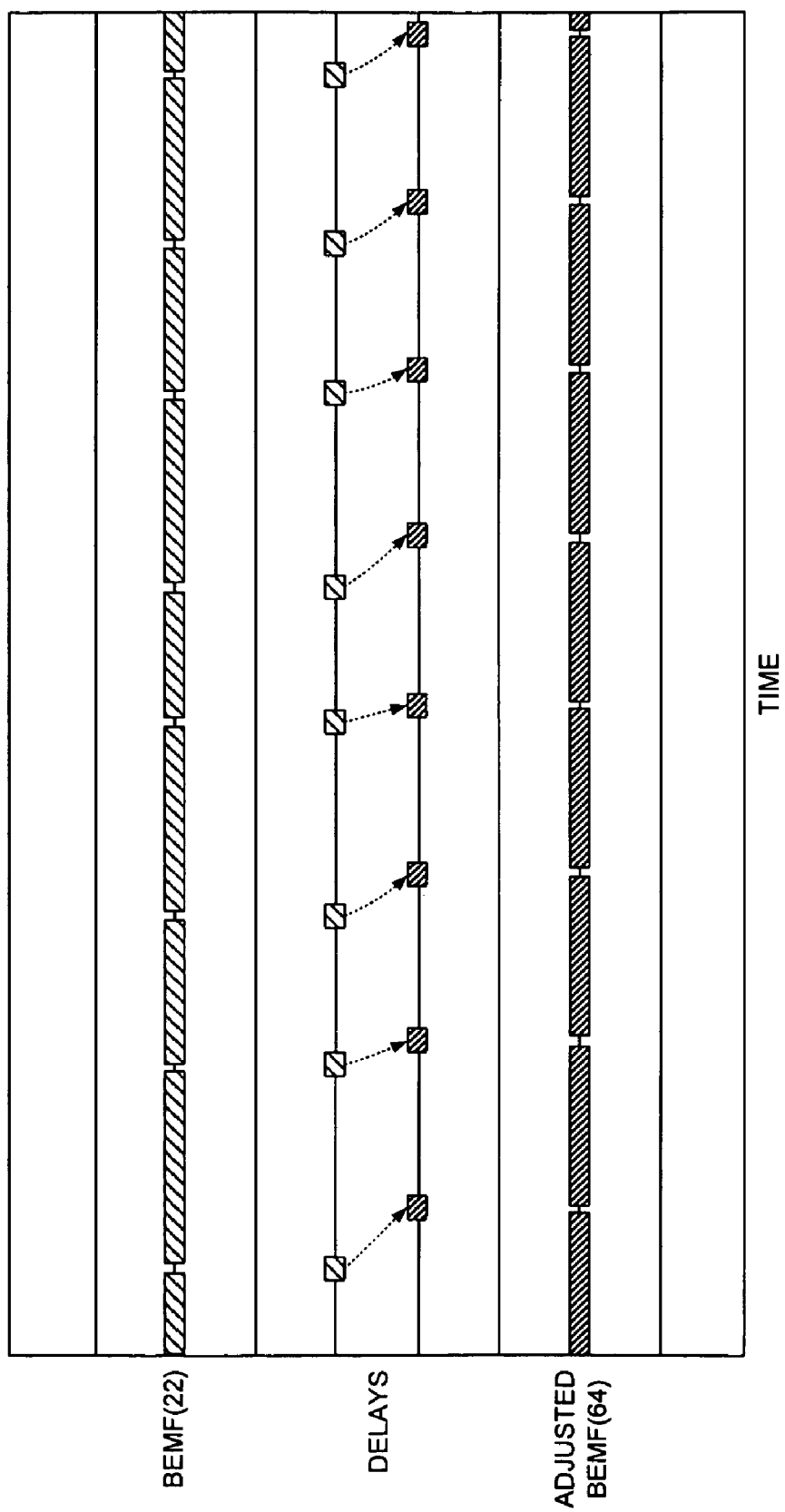
FIG. 5 illustrates how the RPE is extracted from the BEMF signal to generate the adjusted BEMF signal according to an embodiment of the present invention.

FIG. 5 illustrates how the RPE is extracted from the BEMF signal 22 to generate the adjusted BEMF signal 64 in the embodiment of FIG. 4A. In one embodiment, all of the delays loaded into delay register 62 are initialized to a selected phase offset (e.g., 5%-10% of the expected period of a nominal BEMF signal 22). If there is no RPE, the adjusted BEMF signal 64 will be generated as the BEMF signal 22 delayed by the selected phase offset. The effect of RPE in the BEMF signal 22 will shorten or lengthen each period of the adjusted BEMF signal 64. Therefore, as each cycle of the adjusted BEMF signal 64 is detected and compared 68 to the output 66A of the first PLL 58A, if the cycle of the adjusted BEMF signal 64 occurs early, the corresponding delay value stored in the delay register 62 is increased, and if the cycle of the adjusted BEMF signal 64 occurs late, the corresponding delay value stored in delay register 62 is decreased. In this manner, the contribution of RPE in the BEMF signal 22 is substantially removed from the adjusted BEMF signal 64 as shown in FIG. 5.

Figure 6:
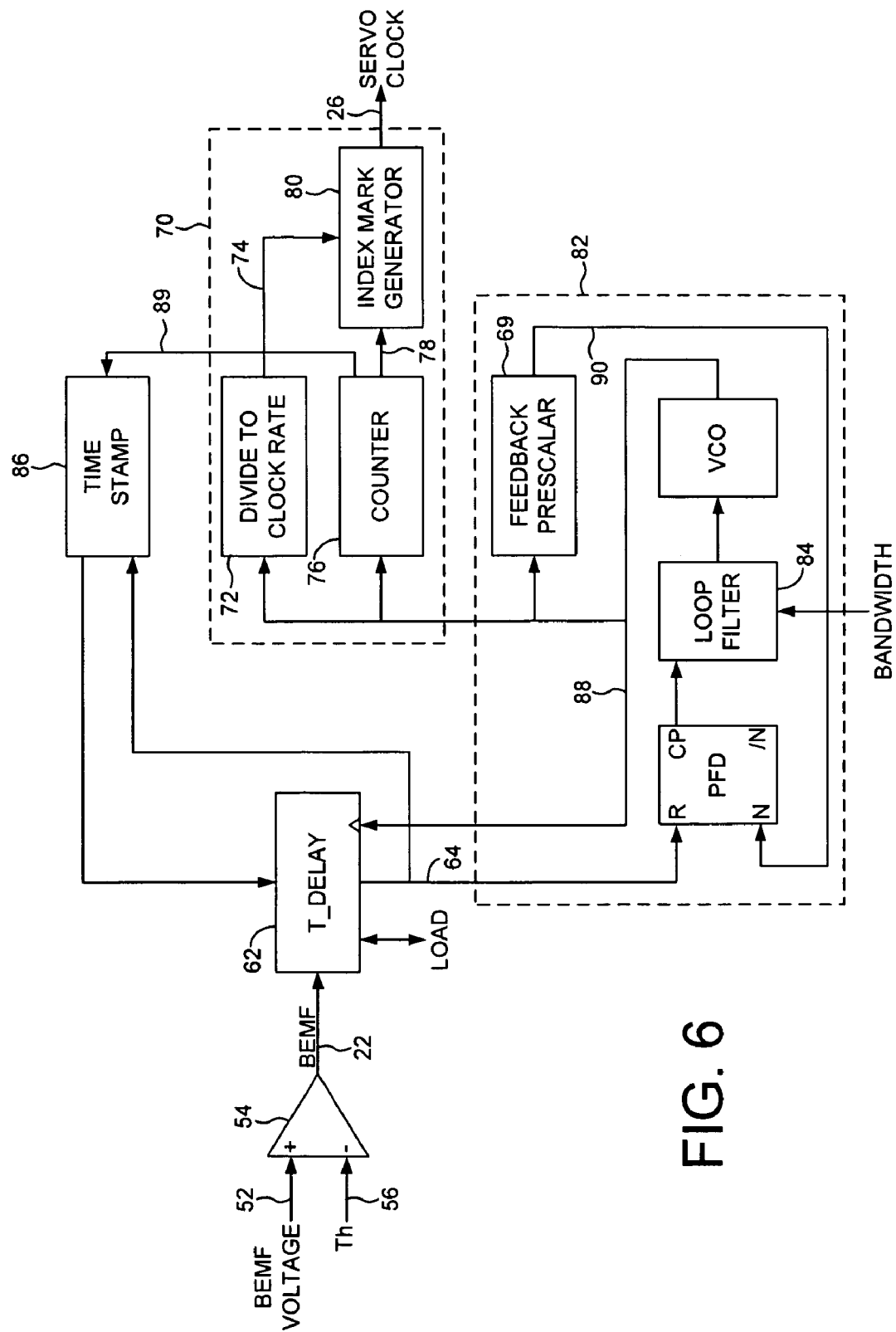
FIG. 6 shows timing circuitry according to an embodiment of the present invention wherein a single PLL is used to extract the RPE from the BEMF signal to generate the servo write clock.

FIG. 6 shows timing circuitry according to an embodiment of the present invention wherein a single PLL 82 is used to extract the RPE from the BEMF signal 22. When learning the RPE in the BEMF signal 22, the loop filter 84 is programmed with a low bandwidth so that the PLL 82 is substantially unaffected by the RPE in the BEMF signal 22. In this embodiment, the early/late comparison is implemented by comparing 86 a time stamp at each period of the adjusted BEMF signal 64 to a target period of the PLL output signal 88.

Figure 7:
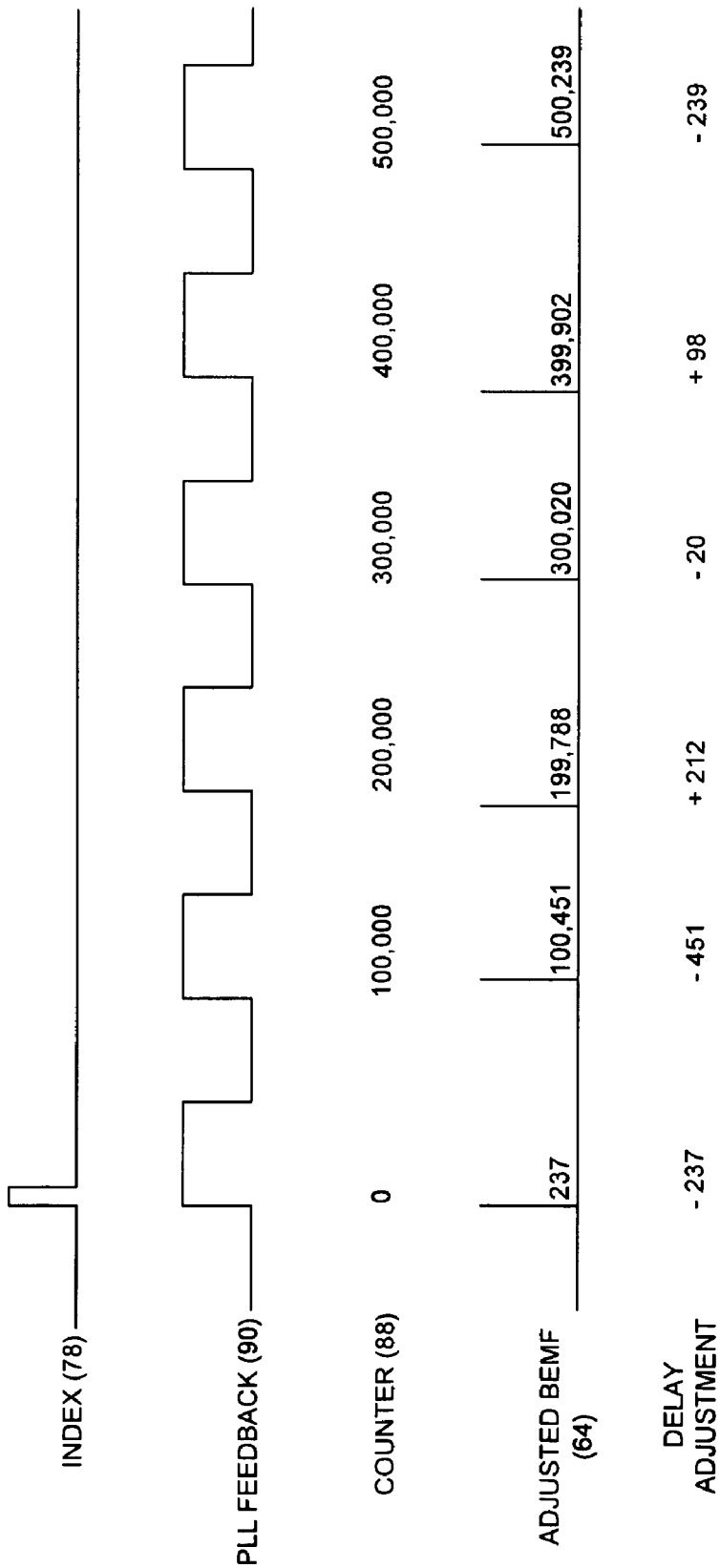
FIG. 7 illustrates how the RPE is extracted from the BEMF signal to generate the adjusted BEMF signal according to an embodiment of the present invention.

FIG. 7 illustrates how the RPE is extracted from the BEMF signal 22 to generate the adjusted BEMF signal 64 in the embodiment of FIG. 6. An index mark is generated (as described above) to mark the beginning sequence of a number of BEMF cycles over a rotation of the disk. The running output 89 of counter 76 is input into a time stamp circuit 86, such that the counter value becomes the time stamp at each pulse of the adjusted BEMF signal 64. The time stamp is compared to a target value (corresponding to the period of the signal 90 output by the feedback prescalar 69) in order to adjust the corresponding delay value stored in delay register 62. In the example of FIG. 7, the first pulse of the adjusted BEMF signal 64 occurs at a time stamp of 237 so the delay adjustment is −237. The next pulse of the adjusted BEMF signal 64 occurs at a time stamp of 100,451, so the delay adjustment is −451, and so on.

In one embodiment, the delay values are adjusted over multiple disk revolutions to allow the delay values to converge toward the correct values. Once the delay values converge, the PLL 82 is effectively synchronized to the adjusted BEMF signal 64 without the RPE in the BEMF signal 22. After learning the delay values corresponding to the RPE, the loop filter 84 is programmed with a higher bandwidth so that the PLL 82 tracks the deviations in the disk rotation speed while writing the servo data to the disk using the servo write clock 26.

Figure 8:
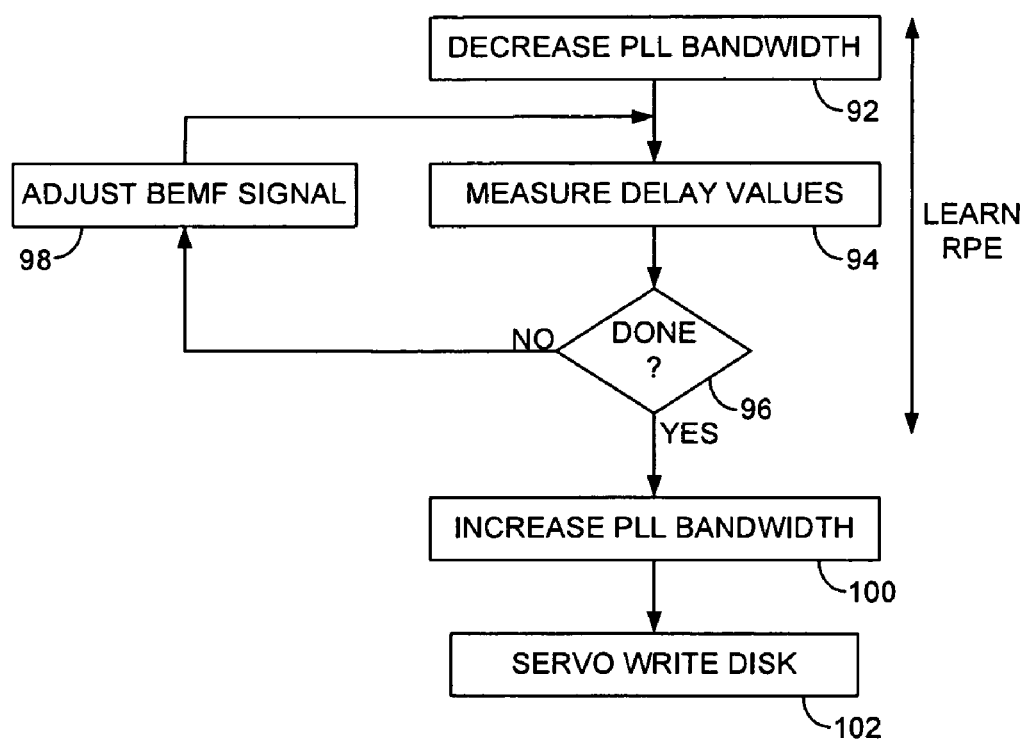
FIG. 8 is a flow diagram according to an embodiment of the present invention wherein the PLL bandwidth is decreased while learning the RPE adjustment values, and then the PLL bandwidth is increased while writing the servo data to the disk.

FIG. 8 is a flow diagram according to an embodiment of the present invention wherein a PLL is used to generate the servo write clock. The PLL is configured to operate with a first bandwidth while learning the RPE in the BEMF signal (step 92). During a disk revolution, the delay values are measured for each cycle of the BEMF signal (step 94). If the delay values have not converged (step 96), the delay values are used to generate the adjusted BEMF signal (step 98). The process is repeated until the delay values converge to suitable values (step 96). For example, the process may be repeated until the derivative of the delay values falls below a threshold. After the delay values converge, the PLL is configured to operate with a second bandwidth higher than the first bandwidth (step 100), and the servo data is written to the disk using the servo write clock (step 102).

In one embodiment, the timing circuitry of FIG. 7 may periodically recalibrate the delay values during the servo writing process (such as after writing every N spiral seed patterns). Prior to the calibration, the bandwidth of the PLL is reduced as described above while adjusting the delay values, and after the calibration the bandwidth of the PLL is increased and the delay values remain fixed while writing the servo data to the disk.

In one embodiment, the delay values loaded into the delay register 62 of FIG. 6 are all adjusted so that the minimum delay value is zero. In other words, after executing the calibration procedure to determine the delay values, the minimum calibrated delay value is subtracted from all of the delay values in order to minimize the transport delay in generating the servo write clock.

In the embodiment described in FIGS. 2A-2B, the servo data written to the disk comprises spiral seed patterns which are subsequently processed to write concentric servo sectors (FIG. 1). However, in other embodiments the servo write clock generated in response to the spindle motor BEMF may be used to write other servo data to the disk, including an embodiment wherein the servo write clock is used to write the concentric servo sectors directly. Generating the servo write clock from the spindle motor BEMF may eliminate the need to insert a clock head into the HDA in order to read a clock track as in the prior art.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of writing servo data onto a disk, the method comprising:
   spinning the disk with a spindle motor;
   measuring a back electromotive force (BEMF) signal from the spindle motor;
   extracting a repeatable phase error (RPE) from the BEMF signal to generate an adjusted BEMF signal;
   synchronizing a servo write clock in response to the adjusted BEMF signal; and
   writing the servo data to the disk using the servo write clock.

2. The method as recited in claim 1, wherein the servo data comprises a spiral seed pattern.

3. The method as recited in claim 1, wherein measuring the BEMF signal comprises comparing a BEMF voltage from the spindle motor to a threshold.

4. The method as recited in claim 1, wherein extracting the RPE from the BEMF signal to generate the adjusted BEMF signal comprises:
   measuring a cycle of the BEMF signal;
   comparing the measured cycle to a target cycle to generate a timing offset; and
   delaying the BEMF signal in response to the timing offset to generate the adjusted BEMF signal.

5. The method as recited in claim 4, further comprising generating the target cycle by synchronizing a first phase-locked loop.

6. The method as recited in claim 5, further comprising generating the target cycle by synchronizing the first phase-locked loop to the BEMF signal.

7. The method as recited in claim 6, wherein synchronizing the servo write clock comprises synchronizing a second phase-locked loop to the adjusted BEMF signal.

8. The method as recited in claim 5, further comprising generating the target cycle by synchronizing the first phase-locked loop to the adjusted BEMF signal.

9. The method as recited in claim 8, further comprising:
   configuring the first phase-locked loop to operate with a first bandwidth while learning the RPE in the BEMF signal; and
   configuring the first phase-locked loop to operate with a second bandwidth while writing the servo data to the disk using the servo write clock, wherein the second bandwidth is higher than the first bandwidth.

10. The method as recited in claim 1, wherein synchronizing the servo write clock comprises synchronizing a phase-locked loop to the adjusted BEMF signal.

11. A servo data writer for writing servo data onto a disk, the servo data writer comprising:
    a spindle motor for spinning the disk;
    a back electromotive force (BEMF) detector operable to detect a BEMF signal from the spindle motor;
    timing circuitry operable to extract a repeatable phase error (RPE) from the BEMF signal to generate an adjusted BEMF signal, and synchronize a servo write clock in response to the adjusted BEMF signal; and
    write circuitry operable to write the servo data to the disk using the servo write clock.

12. The servo data writer as recited in claim 11, wherein the servo data comprises a spiral seed pattern.

13. The servo data writer as recited in claim 11, wherein the BEMF detector detects a BEMF voltage from the spindle motor to a threshold.

14. The servo data writer as recited in claim 11, wherein the timing circuitry is operable to:
    measure a cycle of the BEMF signal;
    compare the measured cycle to a target cycle to generate a timing offset; and
    delay the BEMF signal in response to the timing offset to generate the adjusted BEMF signal.

15. The servo data writer as recited in claim 14, wherein the timing circuitry is operable to generate the target cycle by synchronizing a first phase-locked loop.

16. The servo data writer as recited in claim 15, wherein the timing circuitry is operable to generate the target cycle by synchronizing the first phase-locked loop to the BEMF signal.

17. The servo data writer as recited in claim 16, wherein the timing circuitry is operable to synchronize the write clock by synchronizing a second phase-locked loop to the adjusted BEMF signal.

18. The servo data writer as recited in claim 15, wherein the timing circuitry is operable to generate the target cycle by synchronizing the first phase-locked loop to the adjusted BEMF signal.

19. The servo data writer as recited in claim 18, wherein the timing circuitry is further operable to:
    configure the first phase-locked loop to operate with a first bandwidth while learning the RPE in the BEMF signal; and
    configure the first phase-locked loop to operate with a second bandwidth while writing the servo data to the disk using the servo write clock, wherein the second bandwidth is higher than the first bandwidth.

20. The servo data writer as recited in claim 11, wherein the timing circuitry is operable to synchronize the servo write clock by synchronizing a phase-locked loop to the adjusted BEMF signal.

* * * * *